Aug. 13, 1968  E. L. SCHAUB  3,396,439
CLAMP FOR HOSE OR THE LIKE
Filed April 18, 1966

INVENTOR
ERWIN L. SCHAUB
BY Albert C. Johnston
ATTORNEY

# United States Patent Office 3,396,439
Patented Aug. 13, 1968

3,396,439
CLAMP FOR HOSE OR THE LIKE
Erwin L. Schaub, Middle Village, N.Y., assignor to Ideal Corporation, Brooklyn, N.Y., a corporation of New York
Filed Apr. 18, 1966, Ser. No. 543,245
7 Claims. (Cl. 24—274)

ABSTRACT OF THE DISCLOSURE

A high-tension hose clamp comprises a long band wrapped into overlapping convolutions, a worm screw held rotatably in a support fixed to one band end, slots formed in the other band end to mesh with the screw thread, and means positioning the screw so that the lapping convolution(s) and said other end will pass between the screw and said one end. The screw thread projects through and beneath the slots into a clearance recess formed longitudinally in the underlying band portion. An anti-friction layer between the convolutions enhances the transmission of tension from the screw.

---

The present invention relates to a clamp which encircles a hose, pipe, pipe coupling or the like and applies circumferential clamping pressure to it. Such clamps are commonly referred to as hose clamps. The clamp of this invention is therefore referred to as a hose clamp but only for convenience of description and without limiting in any way the purposes for which the clamp is to be used.

Hose clamps having a band wrapped twice around the surface to be clamped are known, but in the known construction of such clamps the band is slotted along a portion of its length and made narrow along another portion, the width of the slot and narrow portion being about the same to enable the narrow portion to fit within the slot. One convolution of the band is then passed through the slot so that both ends of the band are at the outside of the clamp and the narrow portion of one convolution lies within the slot of the other. With such a construction the tension carrying capacity of a band of a given thickness and width is reduced by the reduction of the effective load-carrying width across the slotted portion and at the narrow portion. In addition, the passage of the narrow portion of the band into and out of the slot over the end edges of the slot produces excessive friction at those points, which cuts down the tension that can be applied to the surface being clamped.

An object of this invention is to provide an improved hose clamp which will apply a high band tension to the surface to be clamped, in relation to the tension applied to the clamp.

Another object is to provide a high-tension hose clamp which is economical to manufacture and simple to assemble.

A further object is to provide such a hose clamp which is easily assembled and tightened upon the surface to be clamped.

According to the present invention, a clamp for hose or the like is provided which comprises an elongated band adapted to be wrapped at least twice around a hose or the like, in overlapping convolutions, and is fitted with a tightening device, such as a worm screw, fixed on one end of the band and engageable with the other end to pull the ends lengthwise toward each other to tighten the clamp. Further, according to the invention, a layer of an anti-friction material having a coefficient of friction less than that of the material forming the band, such, for example, as a strip of polytetrafluoroethylene tape, is disposed along and between the confronting surfaces of the overlapping convolutions and serves to reduce the friction between the convolutions when the clamp is tightened.

By providing a band to wrap at least twice around a hose or the like to be clamped, the mechanical advantage is increased so that a given amount of tension applied to the tightening means produces more clamping pressure on the clamped surface than when the band is wrapped only once around it.

Further, in the clamp of the present invention the band may be of a uniform width, and the successive convolutions ride one upon the other in overlapping relation, so that the tension-carrying capacity of the band is provided by the full width of the band for the major part of its length, and the convolutions wrap smoothly one over the other and do not pass over any ridges or edges—to pass in or out of a slot, for example. Thus, the convolutions slip evenly relative to each other without excessive friction at any one point. Furthermore, the tension loss due to friction between the overlapping convolutions of the band is reduced by the anti-friction material between the convolutions so that the amount of tension transmitted to the surface being clamped is thereby increased.

Since the width of the band of this clamp is uniform, the clamp is more economical to manufacture than clamps which require specially tapered and slotted bands. Moreover, since the clamp is assembled by wrapping the band over itself, the clamp is easily assembled directly on the surface to be clamped. This is an advantage particularly when the object to be clamped, such as a hose, is constructed or located so that it would be difficult or impossible to fit an assembled clamp over the end of the object and then slide the clamp along to the position at which it is to be tightened.

The above and further objects, features and advantages of the invention will be more fully understood from the following detailed description of exemplary embodiments of the invention, which are described with reference to the accompanying drawings. In the drawings.

Figure 1:
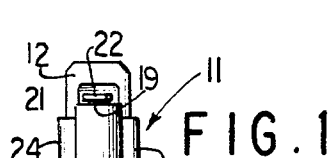
FIG. 1 is a plan view of a clamp in accordance with the invention, which is shown in unassembled flat condition.
Figure 2:
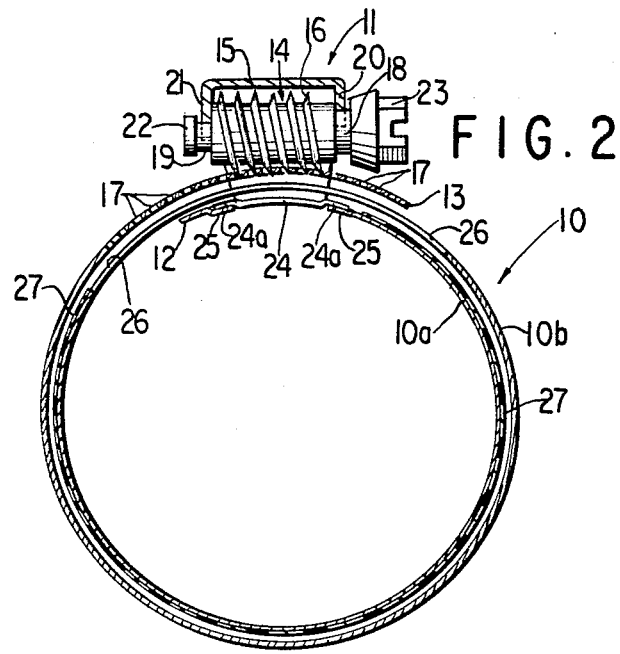
FIG. 2 is a view in section through the same clamp, showing it in assembled condition with the tightening device engaged.

Referring to FIGS. 1 and 2 of the drawings, the clamp therein illustrated comprises an elongated flat flexible band 10 of a material which has high tensile strength, such as stainless steel or some other suitably strong and resilient metal. A tightening device 11 is attached to the end 12 of the band and, as illustrated in FIG. 2, the band is made long enough to be wrapped at least twice around a hose, pipe or other object to be clamped.

The band is wrapped in overlapping inner and outer convolutions 10a and 10b with the end portion 12 of the former at the inside and the other end portion 13 at the outside of the convolutions. The tightening device 11 attached to the inner end portion 12 is adapted to engage the outer end portion 13 and operates to tighten the clamp by pulling the end portions of the band lengthwise relative to each other under tension. When the clamp is tightened the portion of the outer convolution 10b, which passes between the end portions 12 and 13, slides relatively between them and through the tightening device which is constructed to draw the end portions 12 and 13 one over the other relative to the intervening convolution.

As seen in FIG. 2, the tightening device 11 is suitably provided by a worm screw 14 rotatably mounted in a support bracket 15 and aligned for engagement of its screw thread 16 with one or more slots of a sequence of slots 17 formed in the end portion 13 of the band. The slots 17 shown are cut diagonally through the band at intervals along the end portion 13 to match the pitch and spacing of the thread 16 and are provided along a sufficient length of the end portion 13 to enable the clamp to fit and be tightened on hoses, or like objects, of various sizes.

The screw 14 is rotatably supported in the support bracket 15 by journals 18 and 19 at its opposite ends, which extend through U-shaped slots in opposite end walls 20 and 21 of the support bracket. The left-hand end journal 18 (FIG. 2) extends from the body of the screw to a knob 22 outside the bracket. The journal 19 at the other end extends from the body to a hexagonal screw head 23 outside the bracket. As shown, the screw head 23 is slotted so that either a wrench or a screw driver may be used for turning the screw to tighten or loosen the clamp.

The support bracket 15 is attached on the end portion 12 of the band by side legs 24 of the bracket which extend outward from the sides of the upper portion of the bracket and then down past, and in under, the edges of the band. The band is slotted at the points at which the bottom ends of the legs 24 extend in under it, and edges 25 of the slots are bent slightly down from the plane of the band to accommodate tabs 24a, which project from the sides of the bottom ends of the legs 24 and over the bent edges 25 to lock the bracket in place.

The legs 24 hold the bracket 15 spaced from the inner end portion 12 of the band by a distance sufficient to enable the outer convolution 10b and the outer end portion 13 of the band to pass freely between the inner end portion 12 and the screw 14 when the clamp is in assembled condition, in which condition the screw thread 16 will engage some of the slots 17 in the end portion 13. The legs 24 of the bracket 15 could, of course, be made longer if it were desired to have more than two convolutions of the band wrapped about the hose or other object to be clamped.

In order to ensure firm engagement of the screw thread 16 with the slots 17, the thread is made with a sufficient height, or distance of radial projection from the body of the screw, to extend through the slots and project slightly below the underside of the end portion 13. Accordingly, a longitudinal clearance recess or slot 26 for the thread is provided in that portion of the outer convolution of the band which will underlie the sequence of slots 17. As in the case of the sequence of slots 17, the clearance slot 26 extends along the band a sufficient distance to provide for various adjusted sizes of the clamp.

The effective clamping pressure of the clamp of this invention is increased by a layer 27 of anti-friction material, which, when the band is assembled, is disposed along and between the overlapping convolutions. The layer of anti-friction material provides a surface which has a lower coefficient of friction than the surface of the band itself and effectively reduces friction between the confronting surfaces of the overlapping convolutions when the clamp is tightened.

FIG. 1 shows the layer 27 of anti-friction material applied to and along the portion of the band surface which lies between the tightening device 11 and the clearance slot 26. The layer 27 thus forms the outer surface of the inner convolution 10a, facing the inner surface of the outer convolution 10b, when the band is in assembled condition as illustrated in FIG. 2. The layer of anti-friction material could as well be applied to the opposite side of the band between the clearance slot 26 and the sequence of slots 17, where it would form the inner surface of the outer convolution 10b.

The layer 27 may be applied as a coating on the band or as a strip or tape adhered to the band. It could also be a strip of material, which has an anti-friction surface on each side, inserted loosely between the confronting surfaces of the overlapping convolutions.

The layer 27 preferably is a strip of cloth or other porous fabric adhered to the band and coated or impregnated with a substance, such as polytetrafluoroethylene or equivalent material, so as to present an anti-friction surface. The material employed may be a product available commercially under the name "Teflon" tape.

Figure 3:
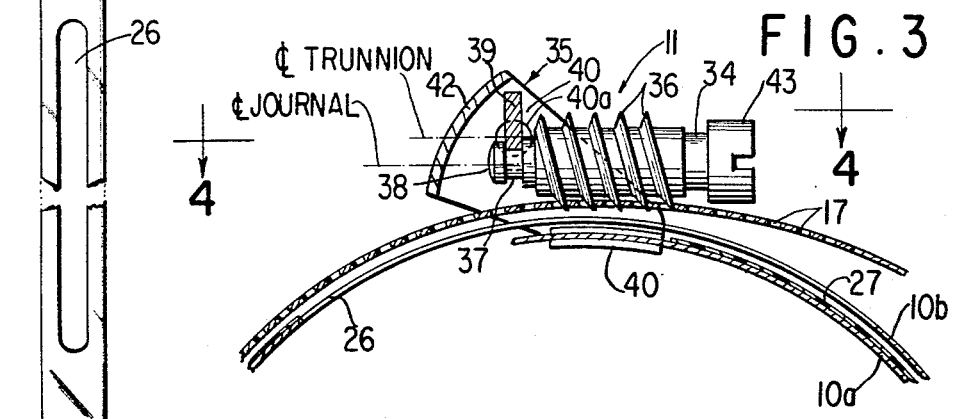
FIG. 3 is a longitudinal section through another form of tightening device, which is shown in engaged position.
Figure 4:
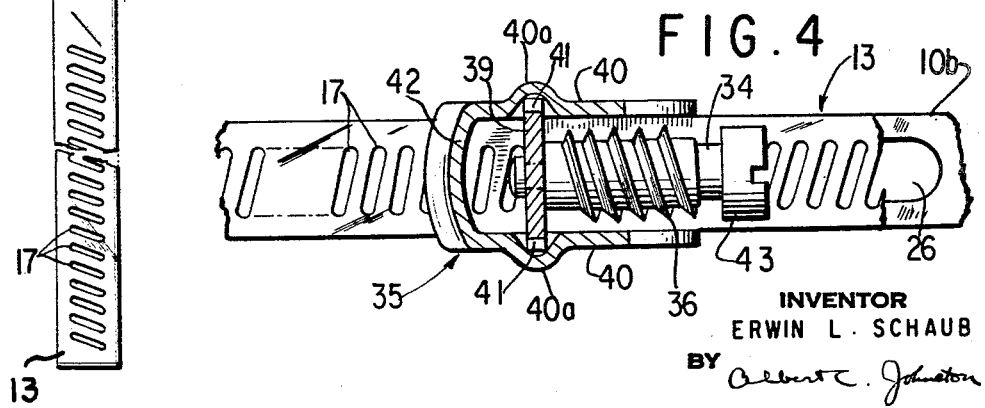
FIG. 4 is a section along the line 4—4 of FIG. 3.

Referring now to FIGS. 3 and 4, these figures show another form of tightening device 11 in which a screw 34 is rotatably and pivotably supported in a support bracket 35 which is attached to the inner end 12 of the band. A journal 37 at one end of the screw, between its body and a knob 38 on its backward end, is carried through a U-shaped slot in a pivot plate 39 which is pivotally supported between the side walls 40 of the bracket 35 by trunnions 41 projecting from the opposite side edges of the plate into dimples 40a in the side walls 40. The side walls 40 extend down past and in under the edges of the inner end portion 12 of the band, where the bottom ends of the walls 40 are bent upward through slots in the band and clinched to secure the bracket to the band. The top of the bracket is formed by a top wall 42 interconnecting the upper ends of the side walls 40.

With this pivotal mounting of the screw 34 in the bracket 35, the body of the screw 34 pivots upward from the position shown in FIG. 3 and away from the band, thus providing clearance through the bracket to facilitate passage of the band therethrough when the band is wrapped into the overlapping convolutions. Then, when the outer end portion 13 of the doubly wrapped band is passed through the bracket 35, the screw 34 is swung down to the position shown in FIG. 3, in which its screw thread 36 engages slots 17 in the end portion 13 of the band for tightening the clamp. A screw driver head 43 on the forward end of the screw serves for rotating the worm to tighten or loosen the clamp.

As shown, the axis of the journal 37 is disposed below the pivotal axis of the trunnions 41 so that the axis of rotation of the screw is between the band and the pivotal axis of the trunnions. Thus, when the thread 36 is engaged in the slots 17 under tension, the resulting longitudinal pressure of the screw against the pivot plate 39 below its pivotal axis acts to press the body of the screw downward and hold the thread 36 in engagement with the slots 17.

This pivotal mounting of the screw 34 also permits quick release of the clamp by enabling the screw to be pivoted up until its thread 36 is lifted out of engagement with the slots 17.

The clamps in accordance with this invention provide an important mechanical advantage by making use of a plurality of band convolutions wrapped in overlapping relation. The structure provided is economical to manufacture and easily assembled. In addition, tension losses within the structure are diminished by the layer or layers of anti-friction material disposed between overlapping convolutions of the band, with the result that more of the tension applied to tighten the clamp is effective as clamping pressure on the hose, pipe coupling or other object being clamped.

The above description is of exemplary embodiments of clamps in accordance with this invention, and it will be understood that variations and modifications may be made in the structure and arrangement described without departing from the scope of the invention defined by the following claims.

What is claimed is:

1. A high-tension clamp comprising a band wrapped in a plurality of convolutions, one overlapping another, to be contracted together upon a hose or the like and tightening means including a support fixed to one end portion of said band and a worm screw held rotatably in said support, the other end portion of said band having formed therein and spaced apart therealong slots which are engageable by the thread of said screw so that by rotation of said screw said other end portion will be pulled longitudinally relative to said one end portion to contract said convolutions, said band being of substantially uniform width between said end portions, said support including means for positioning said screw at a distance away from said one end portion enabling the band portion that forms each convolution over the inner of said convolutions to be passed freely between said one end portion and said screw and then to be overlapped by said other end portion for engagement of said slots by said screw thread, said screw thread having sufficient radial height that it will extend through said slots to a location beneath the underside of said other end portion when in tightening engagement with said slots, the intermediate portion of said band that extends between said end portions into the outer of said convolutions being formed therealong with elongated clearance means to prevent engagement of said intermediate portion by said thread.

2. A clamp according to claim 1, said clearance means being an elongated slot formed longitudinally in said intermediate portion of said band.

3. A clamp according to claim 1, the outer side of said band having a flexible solid anti-friction layer adhered thereto along the portion thereof between said one end portion and said intermediate portion, said layer comprising polytetrafluoroethylene.

4. A high-tension clamp comprising a band wrapped in two convolutions, one overlapping the other, to be contracted together upon a hose or the like and tightening means including a support fixed to one end portion of said band and a worm screw held rotatably in said support, the other end portion of said band having formed therein and spaced apart therealong slots which are engageable by the thread of said screw so that by rotation of said screw said other end portion will be pulled longitudinally relative to said one end portion to contract said convolutions, said band being of substantially uniform width between said end portions, said support including means for positioning said screw at a distance away from said one end portion enabling the band portion that forms the overlapping convolution to be passed freely between said one end portion and said screw and then to be overlapped by said other end portion for engagement of said slots by said screw thread, said screw thread having sufficient radial height that it will extend through said slots to a location beneath the underside of said other end portion when in tightening engagement with said slots, the intermediate portion of said band that extends between said end portions into the outer of said convolutions being formed therealong with elongated clearance means to prevent engagement of said intermediate portion by said thread, and a flexible solid anti-friction layer between said convolutions in contact with at least one of their confronting surfaces to enhance the transmission of tension from said screw along said convolutions.

5. A clamp according to claim 4, said layer comprising a flexible strip of a fabric coated or impregnated with polytetrafluoroethylene to present an anti-friction surface.

6. A clamp according to claim 5, said flexible strip being adhered to the outer side of said band along the portion of said band that forms said inner convolution.

7. A clamp according to claim 5, said flexible strip being disposed loosely between said convolutions.

References Cited

UNITED STATES PATENTS

| | | | |
|---|---|---|---|
| 2,352,372 | 6/1944 | Colarusso | 24—286 |
| 3,167,308 | 1/1965 | Bernstein et al. | 117—132 |
| 3,175,271 | 3/1965 | Schukraft | 24—274 |
| 3,297,343 | 1/1967 | Oetiker | 285—37 |

FOREIGN PATENTS

| | | |
|---|---|---|
| 607,598 | 9/1948 | Great Britain. |

BERNARD A. GELAK, *Primary Examiner.*